United States Patent [19]

Heinrich

[11] Patent Number: 4,529,934
[45] Date of Patent: Jul. 16, 1985

[54] APPARATUS FOR DETECTING A PREDETERMINED ANGULAR POSITION ON ROTATING DEVICES

[75] Inventor: Cap Heinrich, St. Georgen-Peterzell, Fed. Rep. of Germany

[73] Assignee: Papst-Motoren GmbH & Co. KG, St. Georgen, Fed. Rep. of Germany

[21] Appl. No.: 458,030

[22] Filed: Jan. 14, 1983

[30] Foreign Application Priority Data

Jan. 18, 1982 [DE] Fed. Rep. of Germany ....... 3201279

[51] Int. Cl.$^3$ .............................................. G01D 3/66
[52] U.S. Cl. .................................... 324/173; 324/160
[58] Field of Search .............................. 310/168, 111; 340/870.3, 870.34; 324/173, 160

[56] References Cited

U.S. PATENT DOCUMENTS

3,930,201 12/1975 Ackerman ...................... 324/173 X
4,121,112 10/1978 Hartig ............................. 324/173 X
4,166,977 9/1979 Glauert ................................ 324/173
4,356,447 10/1982 Hönig .............................. 324/173 X

Primary Examiner—Stanley T. Krawczewicz
Assistant Examiner—Jose M. Solis
Attorney, Agent, or Firm—Fitch, Even, Tabin & Flannery

[57] ABSTRACT

Apparatus for detecting at least one predetermined angular position on rotating devices, having a tachogenerator with a stator part and a rotor part for producing a tacho signal with speed-dependent frequency. The stator and rotor parts of the tachogenerator form at least four circumferentially directed, substantially equidistantly spaced pole areas. For the purpose of an angular position-dependent amplitude modulation, a pole clearance is provided in at least one of the pole areas in both the stator part and the rotor part of the tachogenerator. An envelope amplifier with a threshold value stage is preferably connected in series with the tachogenerator and essentially only permits the passage of the angular position signals resulting from the coincidence of pole clearances in the rotor and stator parts of the tachogenerator.

13 Claims, 11 Drawing Figures

APPARATUS FOR DETECTING A PREDETERMINED ANGULAR POSITION ON ROTATING DEVICES

BACKGROUND OF THE INVENTION

The invention relates to an apparatus for detecting at least one predetermined angular position on rotating devices, having a tachogenerator with a stator part and a rotor part for producing a tacho signal with speed-dependent frequency, the stator part and rotor part of the tachogenerator forming at least four circumferentially, substantially equidistantly spaced pole areas.

Tachogenerators of the above type are known (pending application U.S. Ser. No. 166,806, filed July, 1979). However, they do not make it possible to supply, in addition to the tacho signal, angular position signals for a plurality of angular positions, which is smaller than the number of tacho signals pulses occurring during each complete revolution. However, it is often necessary to detect or recognise one or more predetermined relative positions between the stator and the rotor. It is then necessary to use a normally optical or magnetic angle indicator, in addition to the tachogenerator. This leads to relatively costly, but imprecisely operating devices.

BRIEF SUMMARY OF THE INVENTION

The problem of the invention is to provide an apparatus with a tachogenerator which, besides the tacho signal, it also able to simply and accurately provide an angular position signal for detecting at least one predetermined angular position on a rotating device.

According to the invention, this problem is solved in that for the angular position-dependent amplitude modulation of the tacho signal, both in the stator part and in the rotor part of the tachogenerator, a pole clearance is provided in at least one of the pole areas.

Without the use of an additional angle indicator, the apparatus according to the invention makes it possible to obtain both a tacho signal and an angular position signal which, during each revolution, only appears once or optionally a few times. In practice, such angular position signals are, for example, required as a starting mark for the beginning of the track when driving magnetic storage disks. Another use is for drives for video head drums. The angular position signals obtained make possible not only a position detection, but optionally also an angular position control (phase control).

If the tachogenerator has a multipolar permanent magnet, the pole clearance can appropriately be formed by a corresponding recess during the magnetization of the permanent magnet or by an air gap which is enlarged in the particular pole area. In the case of wave or undulatory windings, corresponding winding portions can be omitted in the pole area of the pole clearance to be provided.

According to a further development of the invention for the evaluation of the amplitude modulation of the tacho signal, an envelope amplifier can be connected in series with the tachogenerator and is advantageously provided with a threshold value stage, which essentially only permits the passage of angular position signals formed as a result of a coincidence of pole clearances in the rotor part and stator part of the tachogenerator.

BRIEF DESCRIPTION OF THE DRAWINGS

The invention is described in greater detail hereinafter relative to non-limitative embodiments and the attached drawings, wherein.

DETAILED DESCRIPTION OF THE PREFERRED EMBODIMENTS

Figure 1:
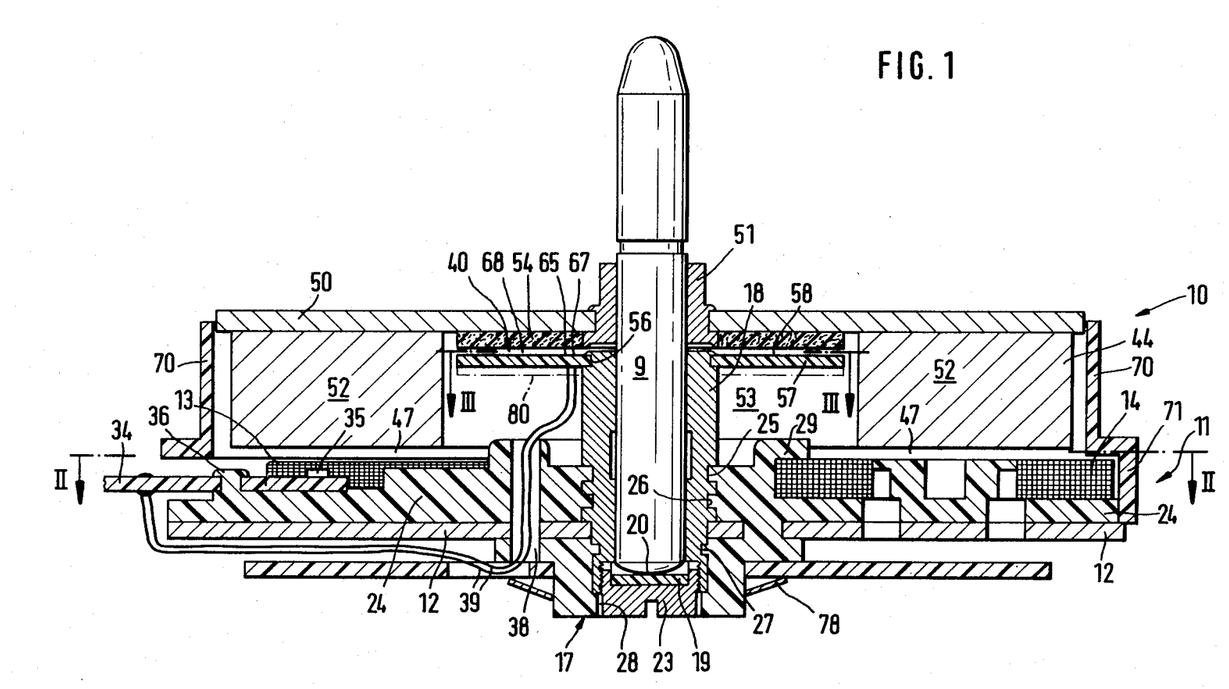
FIG. 1 is a section through a motor equipped with an apparatus according to the invention along the line I—I of FIG. 2.
Figure 2:
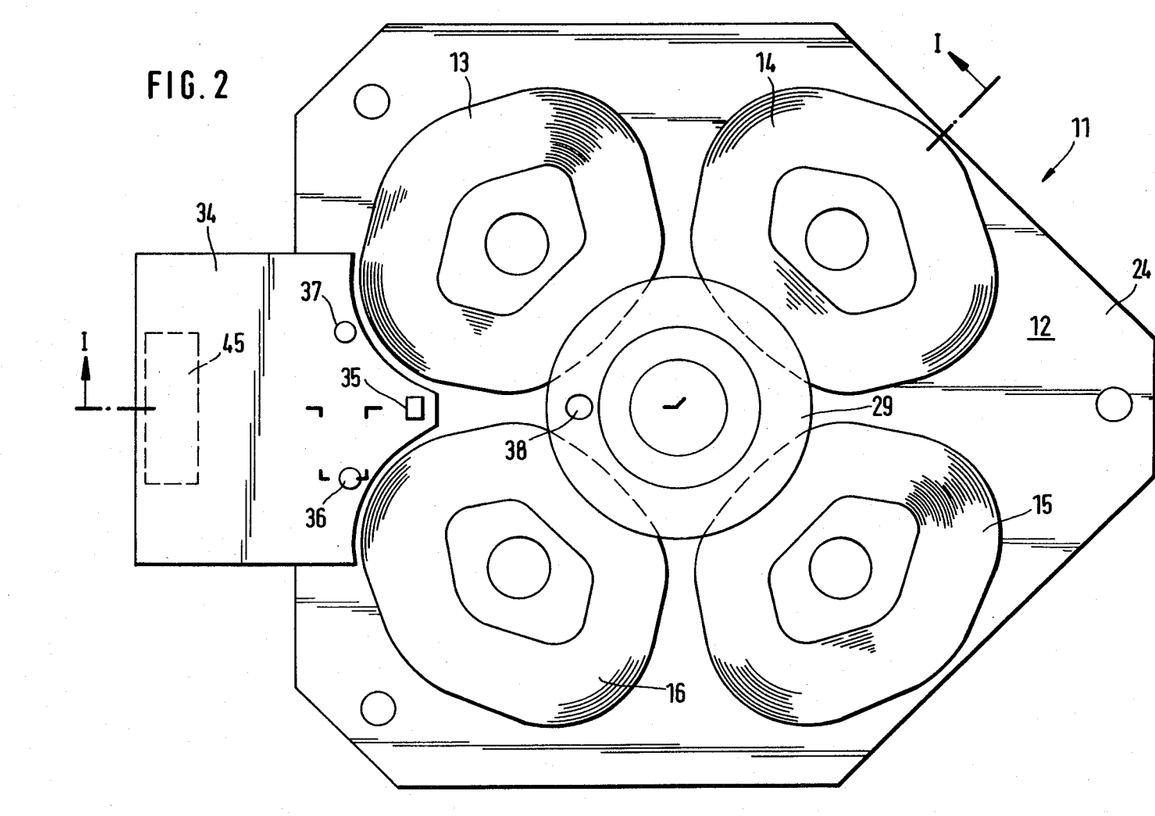
FIG. 2 is a plan view of the stator winding of the motor of FIG. 1 along line II—II of FIG. 1, details of the shaft and the bearing arrangement being omitted.

Motor 10, shown in FIGS. 1 and 2, has a stator 11 with a base plate 12 made from a soft ferromagnetic material, e.g. iron, which serves as a magnetic return path and carries four stator coils 13, 14, 15, 16, an axial bearing 17 and a bearing tube for a rotor shaft 9 constructed as a sliding bearing. The axial bearing 17 is provided with a plastic disk 19, against which engages a track head of rotor shaft 9. A setscrew 23 is used for adjusting axial bearing 17. A plastic moulded article 24 is moulded around base plate 12 and secures the bearing tube by penetrating its circular grooves 25, 26, 27 and holds the screw 23 in a central recess 28. Coils 13 to 16 are secured by a collar 29 of moulded part 24. A printed wiring board 34, serving as a support for a Hall generator 35 or some other galvanomagnetic sensor, is connected to the moulded part 24 by means of two plastic rivets 36, 37. A bushing 38 for the passage of connecting wires 39 of a tachogenerator 40 is formed in moulded part 24 and base plate 12. The wires 39 are led up to the printed wiring board 34 and are soldered to the latter. Wiring board 34 carries a printed circuit and electrical components 45, e.g. the power transistors for controlling coils 13 to 16, resistors, etc. Wiring board 34, e.g. in the form of integrated circuits, can also receive the complete motor control circuitry. As is known from U.S. Pat. No. 4,211,963, the stator coils 13 to 16 are wound roughly pentagonally and are equidistantly spaced. Rotor 44 has a magnetically conductive return plate 50, made e.g. from iron, which is flanged to a socket 51, which is in turn pressed onto shaft 9 and is consequently firmly joined therewith. A motor magnet ring 52, e.g. made from an oxidic magnetic material is bonded to return plate 50 and is axially magnetized in quadripolar manner, as known from U.S. Pat. No. 4,211,963.

Figure 3:
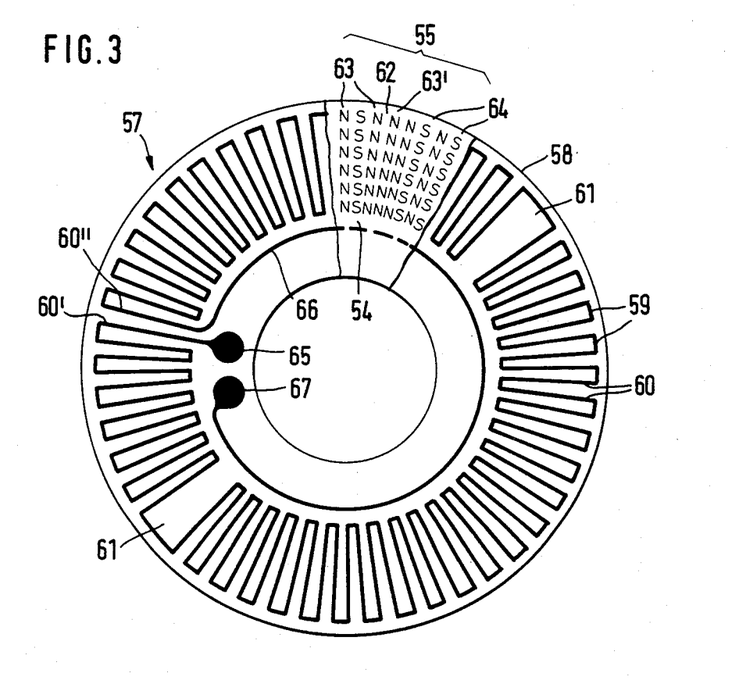
FIG. 3 is a plan view of the tachogenerator winding along line III—III of FIG. 1, the shaft and bearings not being shown.

Magnet ring or annular magnet 52 encloses a cavity 53, which houses in space-saving manner tachogenerator 40. The latter has an annular permanent magnetic plate 54, which can e.g. comprise a rubber magnet, i.e. a mixture of hard ferrites and an elastomer. Magnetic plate 54 is bonded to return plate 50 and in operation rotates therewith. The bottom of magnetic plate 54 is circumferentially alternatively magnetized with north and south poles and appropriately has a large number of pole pairs in order to be able to provide a correspondingly high frequency, e.g. for a frequency control according to FIG. 9 of U.S. Pat. No. 4,174,484. In a cutaway portion at 55, FIG. 3 shows the nature of the magnetization of plate 54, the south poles 64 being designated S and the north pole 63 as N.

At the upper end of bearing tube 18 and facing magnetic plate 54, an insulating plate 57 is flanged to a recess 56. The top 58 of plate 57 is provided with a wave or undulatory winding 59 in the form of a printed circuit (FIG. 3). Undulatory winding 59 has a plurality of radially directed portions 60, the winding pitch coinciding with the pole pitch of magnetic plate 54. This means that apart from the pole clearances described hereinafter, two of the radial winding portions 60 are located opposite each of the magnetic poles 63 or 64. The undulatory winding 59 has a first terminal 65, which leads directly to a radial portion 60', while portion 60" adjacent to portion 60' is connected to a compensating winding 66 which, on the inside of the undulatory winding, is returned rearwards to a second terminal 67, which is very close to terminal 65. Lines 39 are soldered to terminals 65, 67.

If the stray fluxes coming from stator coils 13 to 16 pass through the undulatory winding 59, they induce therein an interfering voltage u1. Simultaneously, these stray fluxes induce in compensating windings 66, an interfering voltage u2, which is approximately equal to −u1. As a result of the series connection of the two voltages, the sum voltage u1+u2 is approximately equal to 0. Thus, the interfering voltage is largely suppressed at output terminal 65, 67, to which is applied only the useful voltage induced in winding 59 by magnetic plate 54.

In the arrangement described hereinbefore, the tachogenerator 40 produces a tacho signal, whose frequency characterizes the speed of the rotor 44 or rotor shaft 9. However, Hall generator 35 cooperates with the poles of the motor magnet ring 52 in order to obtain a number of rotation position signals corresponding to the number of motor poles and as is more particularly required for controlling an electronic commutating circuit, by means of which current is supplied to the stator coils 13 to 16 in rotation position-dependent manner.

Figure 4:
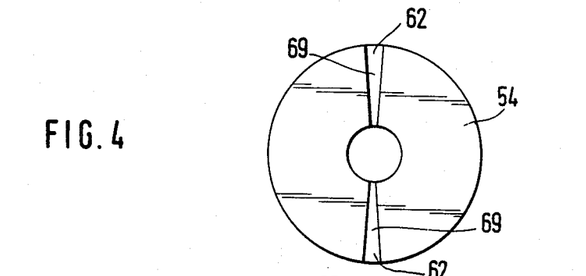
FIG. 4 in smaller scale, is a plan view of the tachogenerator permanent magnet corresponding to a modified embodiment.
Figure 5:
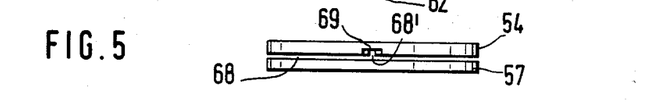
FIG. 5 is a front view of the permanent magnet of FIG. 4.

In order to also obtain an angular position signal which, during a complete revolution, makes it possible to identify a predetermined position of the rotating parts relative to the stationary parts, the two associated radial winding portions are omitted in two diametrically facing pole areas of undulatory winding 59. In this way, two pole clearances 61 are obtained. In a similar way, two diametrically facing pole clearances 62 are formed in magnetic plate 54 of the tachogenerator, as is indicated in FIG. 3 within the diagrammatically represented part of the magnetization 57. Whereas in the solution shown in FIG. 3, the pole clearances 62 are obtained in that an additional north pole 63' is provided in place of one of the south poles 64, one of the north poles 63 can also be replaced by an additional south pole. It is also possible to obtain the desired pole clearance by magnetic plate 54 remaining unmagnetized in one pole pair area, or by providing there a corresponding recess 69 in magnetic plate 54 so as to give an air gap 68' which is larger than the normal tachogenerator air gap 68, as is diagrammatically indicated in FIGS. 4 and 5. According to another alternative, in place of a through-annular magnetic plate 54, it is also possible to provide a corresponding slotted magnetic plate. Whereas in FIGS. 3 to 5, two pole clearances are shown in undulatory winding 59 and magnetic plate 54 of tachogenerator 40, it is clear that, if desired, it is possible to have in one or both of these parts, one or more such pole clearances, in order to produce one or more angular position signals per revolution as a function of the number and reciprocal association of the pole clearances. It is optionally possible in this way to obviate the need for Hall generator 35, i.e. commutation is controlled through the angular position signals of tachogenerator 40.

A hollow cylindrical plastic part 70 is arranged around rotor 44 in such a way that it surrounds the latter with a limited spacing, in order to prevent foreign bodies from penetrating motor 10. Part 70 is provided with a widened base 71, which is fixed to stator 11. By adjusting screw 23, it is possible to jointly adjust motor air gap 47 and air gap 68 of tachogenerator 40. As is indicated by dot—dash lines in FIG. 1, an e.g. iron shielding plate 80 can be located beneath insulating plate 57 for shielding tachogenerator 40 against motor stray fields.

The tacho signal, whose frequency is a measure of the rotor speed, and which is produced at terminals 65, 67 in the case of an opposite rotation of magnetic plate 54 and undulatory winding 59 can be evaluated and further processed in conventional and therefore not shown manner, e.g. for speed detection and/or control.

Figure 6:
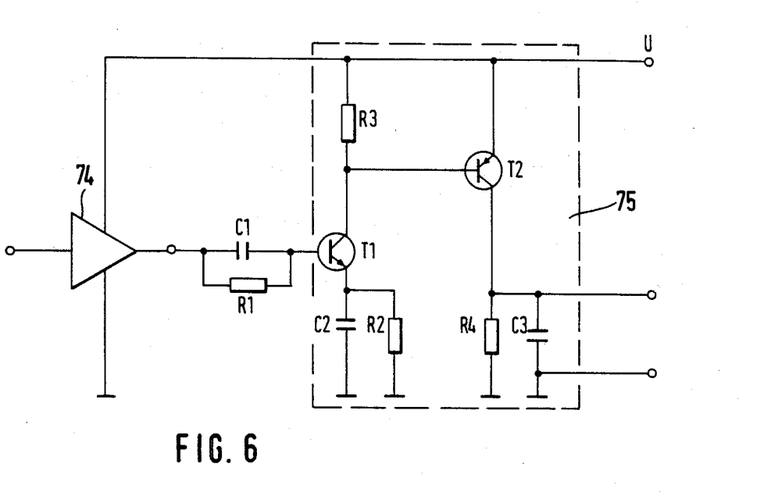
FIG. 6 is a circuit diagram of the envelope amplifier connected in series with the tachogenerator.
Figure 7:
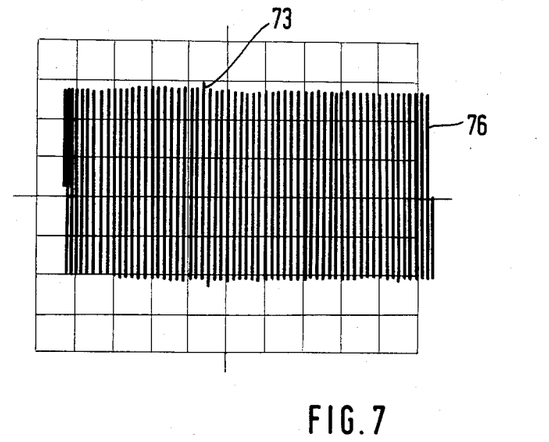
FIGS. 7 to 11 illustrate different signals occurring with the circuit arrangement according to FIG. 6.
Figure 8:
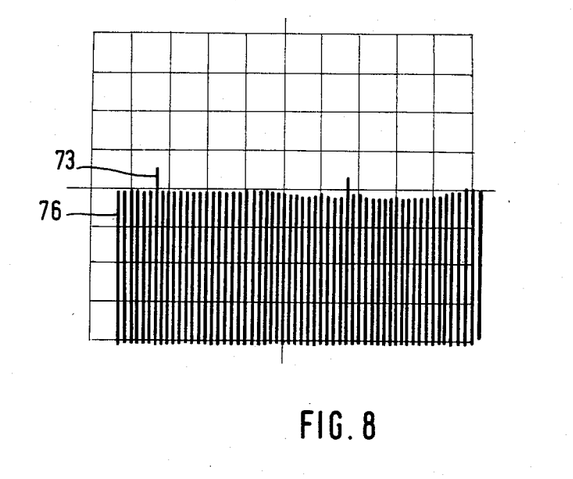

For as long as the pole clearances 61, 62 in the stationary and rotary parts of tachogenerator 40 are not congruent, the tacho signal consists of a sequence of tacho pulses 76, which all have essentially the same amplitude, i.e. there is then no change to the output amplitude of the tacho signal caused by pole clearances 61, 62. However, if the pole clearances 61, 62 rotate above one another, there is a pulse-like amplitude modulation of the tacho signal, as is shown in FIG. 7 and even more clearly in the larger-scale representation of the tacho signal envelope curve at 73 in FIG. 8. For the detection and acquisition of this angular information, a preamplifier 74 and a following envelope amplifier 75 are connected to the tachogenerator (i.e. terminals 65, 67 in FIG. 3) in accordance with FIG. 6. Between the output of preamplifier 74 and the input of envelope amplifier 75, there is a high-pass filter comprising a capacitor C1 and a resistor R1 connected in parallel therewith. Envelope amplifier 75 has a first amplifier stage formed by an npn transistor T1, the base of transistor T1 being connected to the output of the high-pass filter C1, R1. A further high-pass filter formed by a storage capacitor C2 and a parallel-connected resistor R2 is located in a feedback branch between the emitter of transistor T1 and earth. The collector of transistor T1 is connected across a load resistor R3 to a supply voltage $U_{batt}$. The base of a pnp transistor T2 forming a second amplifier stage is connected to the junction between the collector of transistor T1 and the resistor R3. The emitter of transistor T2 is connected to the supply voltage $U_{batt}$. A load resistor R4, with which is connected in parallel a capacitor C3, is positioned between the collector of transistor T2 and earth.

Figure 9:
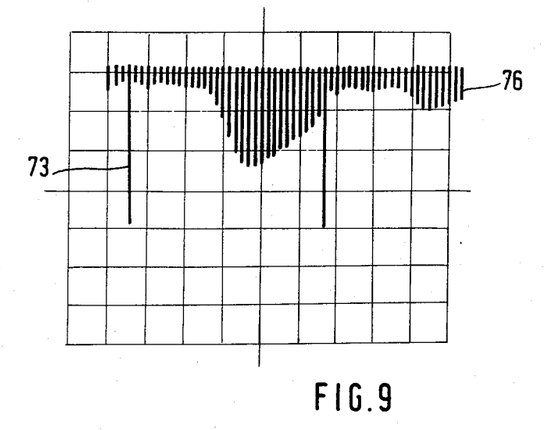
Figure 10:
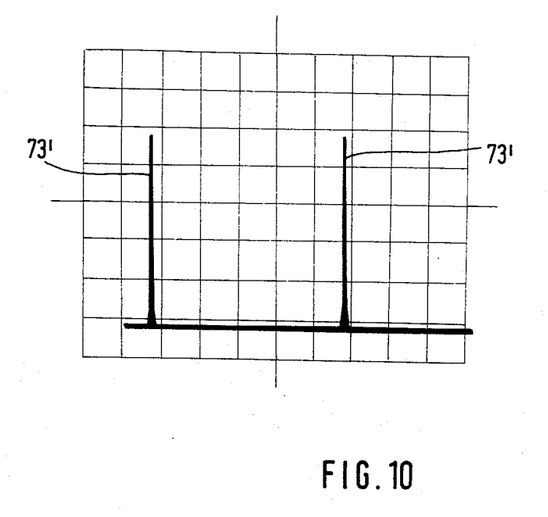
Figure 11:
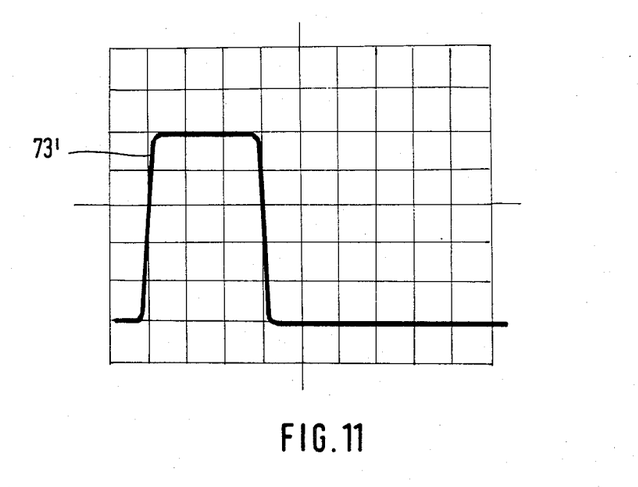

The direct current operating point of transistor T1 connected as a pulse rectifier, is determined by the tacho signal or the preamplifier 74. Very low frequency amplitude or operating point fluctuations are suppressed by the high-pass filter C1, R1 at the base of transistor T1. Capacitor C2 is charged by means of transistor T1 corresponding to the tacho signal peaks. There is a particulary powerful recharging of the storage capacitor at each sudden amplitude rise of the tacho signal (peak 73 in FIGS. 7 and 8). As a function of the tacho signal frequency occurring in normal operation and the time spacing between the amplitude data (peaks 73) forming the angular position signals, capacitor C2 and resistor R2 are sized in such a way that a maximum difference is obtained between the normal recharging pulses for capacitor C2 and the heterodyne pulses (peaks 73). In particular, high-pass filter C2, R2 is sized in such a way that capacitor C2 stores the regularly occuring peak voltage, i.e. the peak voltage value of the normal tacho pulses 76 (FIGS. 7 and 8) and can also follow slow voltage changes of the tacho signal, but no storage takes place of the individually occurring input pulse peaks 73. Thus, pulse peaks 73 always lead to a powerful emitter current pulse of transistor T1. The emitter current of transistor T1 largely flows across the collector of this transistor and causes a corresponding voltage drop at load resistor R3. The signal occurring at resistor R3 is shown in FIG. 9. As is apparent, as a result of the explained circuit design, the angular position pulses 73 are much larger than the normal tacho pulses 76. Resistor R3 is sized in such a way that only the larger angular position pulses (peak 73), but not the smaller normal recharging pulses (tacho pulse 76) exceed the base/emitter (BE) threshold voltage of transistor T2. A clean trigger pulse 73' is then available at resistor R4 as an angular position signal, cf FIG. 10. The shape of this trigger pulse is illustrated in FIG. 11 with an extended time scale (e.g. with a time base of 100 μs). The trigger pulses have an exact phase position to the tacho system. Undesired h.f oscillations are suppressed by the capacitor C3.

It is apparent from what has been stated hereinbefore that the envelope amplifier 75 forms a threshold value stage, which essentially only permits the passage and amplifies the angular position signals formed as a result of coincidence of pole clearances 61, 62 in the rotor and stator parts of tachogenerator 40.

I claim:

1. Apparatus for detecting at least one predetermined angular position on rotating devices, comprising a tachogenerator having a stator part and a rotor part each concentrically arranged about a common axis and opposing one another, one of said stator and rotor parts having a winding and the other of said stator and rotor parts having a permanent magnet for inducing a voltage in said winding to produce a tacho signal with speed-dependent frequency, the stator part and rotor part of the tachogenerator each providing at least four circumferentially, substantially equidistantly spaced pole areas, a pole clearance (61, 62) being provided in both the stator part (57, 59) and in the rotor part (44) of the tachogenerator (40) in at least one of the pole areas for producing angular position-dependent amplitude modulation of the tacho signal.

2. Apparatus according to claim 1 in which the rotor or stator parts of the tachogenerator have a multipolar permanent magnet, wherein the pole clearance (62) if formed by an unmagnetized portion created during the magnetization of the permanent magnet (54).

3. Apparatus according to claim 1 in which the rotor or stator parts of the tachogenerator have a multipolar permanent magnet, wherein the pole clearance is formed by an air gap (68') enlarged in the particular pole area.

4. Apparatus according to one of the preceding claims in which the stator or rotor is provided with a wave or undulatory winding with a sequence of substantially radially directed winding portions, which are interconnected by substantially circumferentially directed winding portions, wherein for forming the pole clearance (61) in the particular pole area, a pair of adjacent radial winding portions (60) is omitted.

5. Apparatus according to claim 4, wherein an envelope amplifier (75) is connected in series with the tachogenerator (40) for evaluating the amplitude modulation of the tacho signal.

6. Apparatus according to claim 5, wherein the envelope amplifier (75) is provided with a threshold value stage, which essentially only permits the passage of angular position signals formed as a result of a coincidence of pole clearances (61, 62) in the rotor and stator parts of the tachogenerator (40).

7. Apparatus according to claim 6, wherein the envelope amplifier (75) has a first amplifier stage (T1) that receives an input signal corresponding to the output signal of the tachogenerator (40) and which is provided with a feedback branch that includes a high-pass filter (C2, R2).

8. Apparatus according to claim 7, wherein the envelope amplifier (75) has a first transistor (T1), to whose base is applied an input signal corresponding to the output signal of the tachogenerator (40) and whose emitter is connected across a storage capacitor (C2) to a reference potential and whose collector is at the supply voltage across a load resistor (R3).

9. Apparatus according to claim 8, wherein the charging/discharging time constant of the storage capacitor (C2) is such that the storage capacitor stores the regularly occurring peak voltage of an input signal (76) and follows slow changes to this peak voltage, whereas individually occurring angular input pulse peaks (73) remain unstored.

10. Apparatus according to claim 9, wherein the envelope amplifier (75) has a second amplifier stage with a second transistor (T2) series-connected with the first transistor (T1) and whose controlled input is connected to the load resistor (R3), said second transistor having a base—emitter threshold voltage which is higher than the voltage drop at the load resistor (R3) caused by the normal tacho-generator signals (76) but is lower than the voltage drop at the load resistor caused by the angular position signals (73).

11. Apparatus according to claim 10, wherein a high-pass filter (3, R4) for suppressing interfering high frequency oscillations is connected in parallel with the output of the envelope amplifier (75).

12. Apparatus according to claim 11, wherein a high-pass filter (C1, R1) for suppressing low frequency interfering signals is connected ahead of the input of the envelope amplifier.

13. Apparatus according to claim 1, wherein an envelope amplifier (75) is connected in series with the tachogenerator (40) for evaluating the amplitude modulation of the tacho signal.

* * * * *

UNITED STATES PATENT AND TRADEMARK OFFICE
CERTIFICATE OF CORRECTION

PATENT NO. : 4,529,934
DATED : July 16, 1985
INVENTOR(S) : Heinrich Cap

It is certified that error appears in the above-identified patent and that said Letters Patent is hereby corrected as shown below:

Face of Pat., Line 2, change Inventor's name from "Heinrich" to --Cap--.
Face of Pat., Line 6, change Inventor's name from "Cap Heinrich" to --Heinrich Cap--.
Col. 1, Line 32, change "it also able" to --is also able--.
Col. 2, Line 8, change "." (period) to --;-- (semicolon).
Col. 2, Line 19, change "." (period) to --;-- (semicolon).

Col. 5, Line 64, change "if" to --is--.

Signed and Sealed this

Thirteenth Day of May 1986

[SEAL]

Attest:

DONALD J. QUIGG

Attesting Officer  Commissioner of Patents and Trademarks